UNITED STATES PATENT OFFICE.

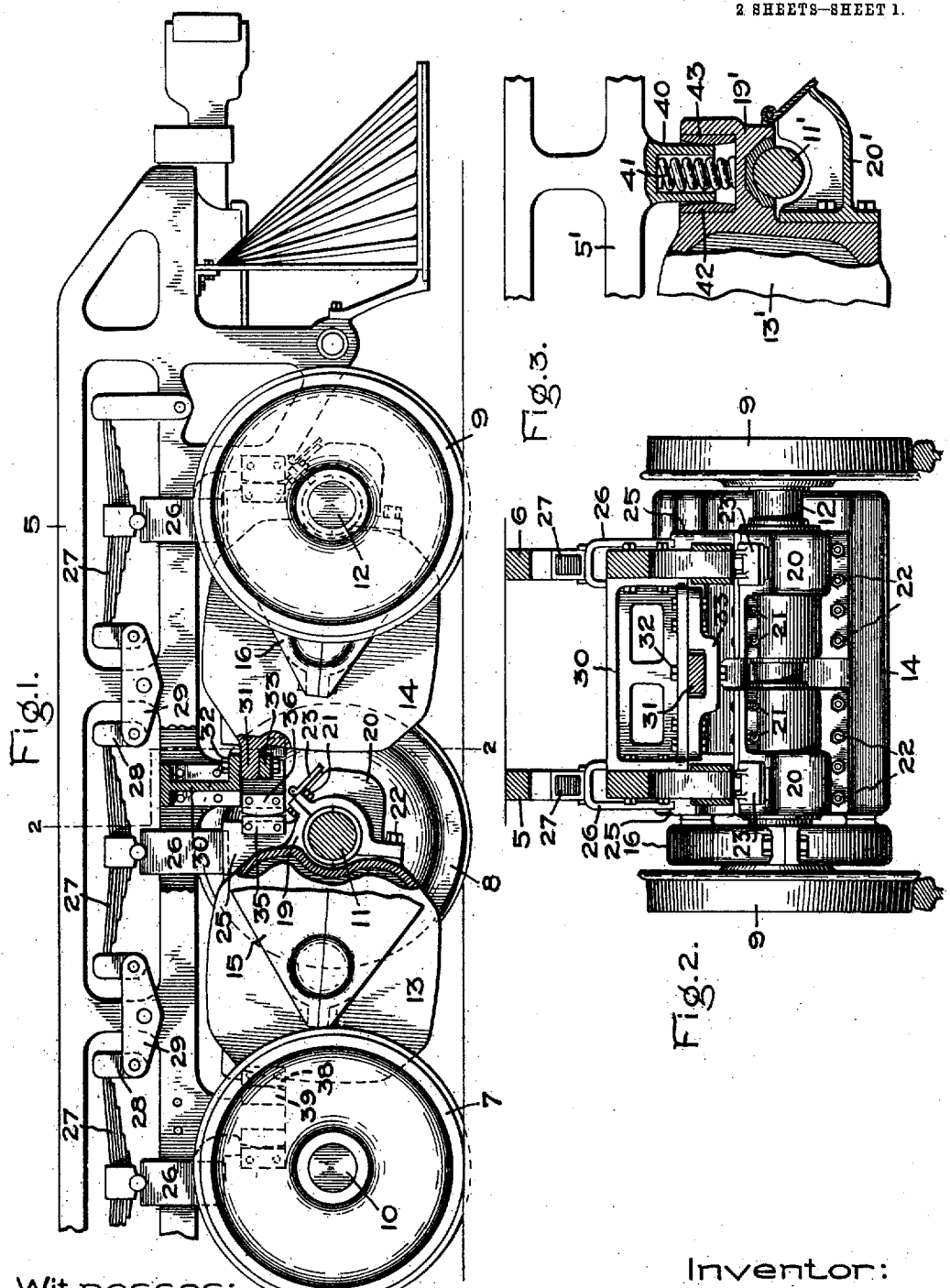

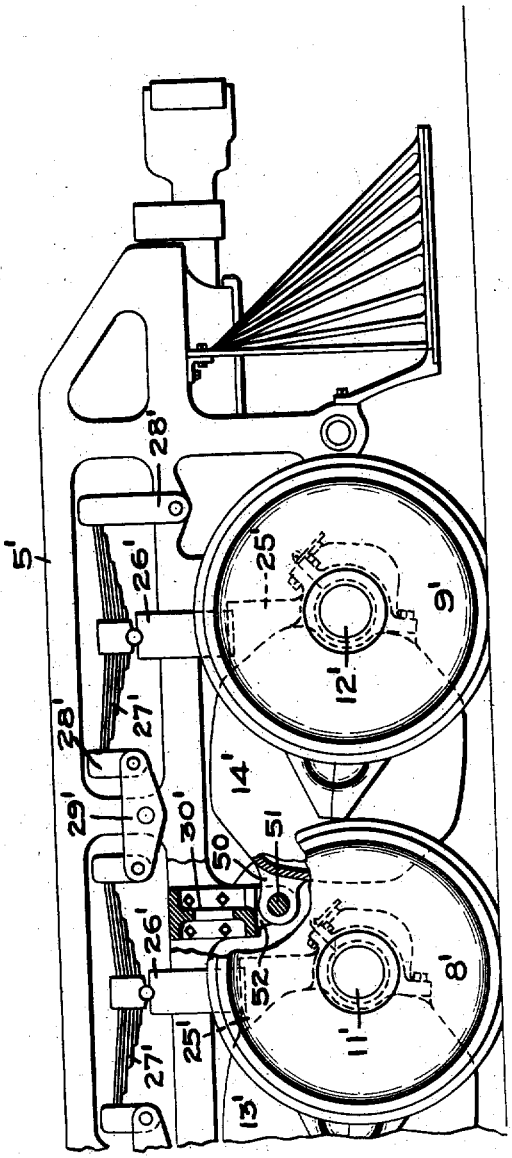

EDWARD D. PRIEST, OF SCHENECTADY, NEW YORK, ASSIGNOR TO GENERAL ELECTRIC COMPANY, A CORPORATION OF NEW YORK.

RAILWAY-TRUCK.

977,839.  Specification of Letters Patent.  Patented Dec. 6, 1910.

Application filed July 30, 1910. Serial No. 574,632.

*To all whom it may concern:*

Be it known that I, EDWARD D. PRIEST, a citizen of the United States, residing at Schenectady, county of Schenectady, State of New York, have invented certain new and useful Improvements in Railway-Trucks, of which the following is a specification.

My invention relates to railway trucks and particularly to trucks provided with electric motors for driving the wheels of said truck.

It is an object of my invention to provide a new and improved truck which is simple in construction and reliable and efficient in operation.

In general, my invention consists in supporting the truck frame and the driving motors on the same journal boxes mounted on the wheel axles between the wheels, the motors being also connected to and partially supportd by the frame of the truck.

My invention will be understood from the following description taken in connection with the accompanying drawing, in which—

Figure 1 is a side elevation, partly in section, of a portion of a truck having my invention embodied therein; Fig. 2 is a transverse section of the truck in elevation on the line 2—2 of Fig. 1; Fig. 3 is a fragmentary view showing a modified form of construction in which my invention may be embodied; and Fig. 4 is a view similar to Fig. 1 showing another form of my invention.

Referring particularly to Figs. 1 and 2, the side members of the truck frame are indicated at 5 and 6. Only three pairs of driving wheels are shown, these being indicated at 7, 8 and 9, and having axles 10, 11 and 12. Only two motors 13 and 14 are shown, these being geared to the axles 11 and 12 upon which the wheels 8 and 9 are mounted. The gearing between the motors and their coöperating axles may be of the usual form of pinion and gear inclosed within the gear casings 15 and 16.

The side frames 5 and 6 of the main truck frame are located between the driving wheels, and coöperating with each wheel axle are two journal boxes which support not only the side frames 5 and 6 but also one side of each of the driving motors. The upper part 19 of these journal boxes, which carries the bearing brass, may be secured to or made integral with the frame of the driving motor which coöperates with that axle upon which those journal boxes are supported. The other half 20 of the journal box which serves as a cap plate may be of the form shown so as to provide a pocket for holding oil or waste in the usual manner, and may be bolted to part 19 by bolts 21 and 22. A cover 23 allows access to the journal box for the purpose of oiling.

In the form of truck shown in Figs. 1 and 2, the side frames 5 and 6 are supported upon an extension 25 from the upper part 19 of the journal boxes through yokes 26 and any well-known system of springs 27 and equalizing links and levers 28 and 29. The journal boxes on each axle, therefore, not only partially support the motor which drives that axle, but they also help support the frame of the truck upon which the car body rests. The other side of each motor is supported from a cross frame 30 which connects the side frames 5 and 6. This supporting arrangement may consist of a lug 31 integral with the motor frame, which lug is secured by a bolt 32 between a yoke 33 and the bottom of the cross frame 30, said yoke being bolted to said cross frame. In the arrangement of Figs. 1 and 2, the motor frame, and the journal boxes which are in effect part of it, are held from movement longitudinally of the truck frame by means of sliding bearings. One of these bearings is shown as comprising a bearing plate 35 secured to the motor frame just above the journal boxes, a coöperating bearing plate 36 being secured to the cross frame 30. These bearing plates permit vertical sliding movement between the journal boxes and the side frames 5 and 6 and at the same time prevent movement of the journal boxes in one direction longitudinally of the truck. Movement of the journal boxes and the motor frame longitudinally of the truck in the other direction is prevented by a bearing plate 38 secured to the other side of the motor from the bearing plate 35, this plate 38 being arranged to engage with a bearing plate or part 39 on the cross frame 30. Of course the sliding movement between the plates 38 and the parts 39 is very slight, owing to the fact that the movement of the motor is pivotal on a horizontal axis through the lug 31 and the bolt 32.

In Fig. 3 I have shown another way in which a side frame 5′ may be resiliently supported on a journal box which is secured to the motor frame, longitudinal movement of the journal box with reference to the frame being prevented in a different way from that illustrated in Figs. 1 and 2. In Fig. 3 the wheel axle is indicated at 11', the motor at 13', the upper half of the journal-box at 19', and the lower half at 20', the construction and arrangement of these parts being obvious from the drawing. The side frame 5' is provided with a hollow downwardly projecting lug 40 which extends into an opening in the top of the journal-box member 19'. Within the opening in the lug 40 is a spring 41 which yieldingly supports the side frame 5' on the journal box 19'. Bearing plates 42 and 43 may be located between the lug 40 and the forward and rear walls of the cavity in the bearing member 19'. With the arrangement of Fig. 3, the motor frame is pivotally supported on a cross frame of the truck as in the construction of Figs. 1 and 2, but in Fig. 3 the longitudinal movement of the journal boxes and motor with reference to the truck frame is prevented by the engagement of the bearing plates 42 and 43 with the lug 40, and no bearing plates on the other side of the motor are necessary.

Fig. 4 shows still another way in which longitudinal movement between the journal boxes and the truck frame may be prevented. In this construction the principal difference from the arrangement of Figs. 1 and 2 resides in the fact that no bearing surfaces are provided between the motors and the truck frame, the motor instead being pivotally connected to the truck frame at one end so that the journal boxes may move in the arc of a circle around this pivotal point. Referring to Fig. 4, the truck frame is indicated at 5', the wheels at 8' and 9', and the motors at 13' and 14'. The journal boxes coöperating with the wheel axles 11' and 12' may be similar to the journal boxes shown in Fig. 1 and the truck frame may be supported on extensions 25' from the upper part of the journal boxes, through yokes 26', springs 27' and equalizing links and levers 28' and 29', exactly as has been described above in connection with the arrangement of Fig. 1. The manner in which the sides of the motors opposite the journal boxes are supported in the truck frame is, however, different from the arrangement used in the truck of Figs. 1, 2 and 3. The connection between the motors and the truck frame is shown in Fig. 4 only for the motor 14', but of course may be the same for the other motors. This connection which is a pivotal one comprises lugs 50, preferably cast integral with the frame of the motor, said lugs being pierced by a rod 51 which extends through them and through lugs 52 extending downwardly from the cross frame 30'. The motor 14' is, therefore, hinged to the cross frame 30' and although the axle 12' and the journal boxes thereon move in the arc of a circle around the rod 51, this movement being slight is substantially in a vertical plane. It is apparent that, with this arrangement, the wheel axle and the journal boxes are held in correct position with reference to the side frames of the truck, while at the same time the necessary vertical movement is permitted. Bearing surfaces similar to those shown in Figs. 1 and 3 are, therefore, unnecessary in the arrangement of Fig. 4.

It will be obvious to those skilled in this art that the construction which I have shown and described may be modified in many respects, without departing from the spirit of my invention, and I aim to cover all such arrangements in the following claims.

What I claim as new and desire to secure by Letters Patent of the United States, is:—

1. In a railway truck, a plurality of axles having driving wheels secured thereto, journal boxes on said axles between the wheels, a truck frame supported on said journal boxes, and driving motors jointly supported by said journal boxes and said frame.

2. In a railway truck, a plurality of axles having driving wheels secured thereto, journal boxes on said axles between the wheels, a truck frame mounted upon said journal boxes, and driving motors geared to said axles and supported jointly by said journal boxes and said frame.

3. In a railway truck, a plurality of axles having driving wheels secured thereto, journal boxes on said axles between the wheels, a truck frame having side members yieldingly supported on said journal boxes, and driving motors geared to said axles and supported on one side on said journal boxes and on the other side by the truck frame.

4. In a railway truck, a plurality of axles having wheels secured thereto, a motor geared to each axle, journal boxes on said axles between the wheels upon which one side of the coöperating motor is supported, a truck frame supported on said journal boxes, and a mechanical connection between the other side of said motors and said frame.

5. In a railway truck, a plurality of axles having driving wheels secured thereto, a driving motor geared to each axle, journal boxes on said axles between the wheels carrying one side of the coöperating motor, a truck frame yieldingly supported on said journal boxes, and a mechanical connection between the other side of said motors and said truck frame.

6. In a railway truck, a plurality of axles having driving wheels secured thereto, journal boxes on said axles between the wheels, a truck frame supported on said journal boxes, driving motors jointly supported by said journal boxes and said frame, and means for preventing longitudinal movement of said journal boxes and motors with reference to said frame.

7. In a railway truck, a plurality of axles having driving wheels secured thereto, journal boxes on said axles between the wheels, a truck frame yieldingly mounted upon said journal boxes, driving motors geared to said axles and supported jointly by said journal boxes and said frame, and sliding bearings between said frame and said journal boxes for preventing movement of said journal boxes longitudinally of the frame while permitting their movement vertically of the frame.

In witness whereof, I have hereunto set my hand this 27th day of July, 1910.

EDWARD D. PRIEST.

Witnesses:
BENJAMIN B. HULL,
HELEN ORFORD.